United States Patent
Kaminski et al.

(10) Patent No.: US 8,010,147 B2
(45) Date of Patent: Aug. 30, 2011

(54) METHOD AND APPARATUS FOR INTERFERENCE LIMITATION IN UPLINK COMMUNICATION IN A CELLULAR COMMUNICATION SYSTEM

(75) Inventors: Stephen Kaminski, Eislingen (DE); Hajo Bakker, Eberdingen (DE)

(73) Assignee: Alcatel Lucent, Paris (FR)

( * ) Notice: Subject to any disclaimer, the term of this patent is extended or adjusted under 35 U.S.C. 154(b) by 405 days.

(21) Appl. No.: 11/836,102

(22) Filed: Aug. 8, 2007

(65) Prior Publication Data
US 2008/0039131 A1    Feb. 14, 2008

(30) Foreign Application Priority Data
Aug. 10, 2006 (EP) .................... 06300873

(51) Int. Cl.
*H04B 1/00* (2006.01)
*H04B 15/00* (2006.01)
*H04B 7/00* (2006.01)
*H04B 7/185* (2006.01)

(52) U.S. Cl. ........ 455/522; 455/501; 455/63.1; 370/318

(58) Field of Classification Search .................. 455/437, 455/438, 439, 501, 522, 63.1, 67.11, 67.13, 455/69; 370/318
See application file for complete search history.

(56) References Cited

U.S. PATENT DOCUMENTS

| | | | | |
|---|---|---|---|---|
| 6,741,837 B1* | 5/2004 | Nakano et al. | ............. | 455/67.11 |
| 7,031,712 B2* | 4/2006 | Takano et al. | ................. | 455/442 |
| 7,366,130 B2* | 4/2008 | Qiu et al. | ....................... | 370/328 |
| 7,453,861 B2* | 11/2008 | Leung et al. | ................... | 370/342 |
| 7,609,661 B2* | 10/2009 | Chae et al. | ..................... | 370/310 |
| 2003/0181208 A1* | 9/2003 | Lobinger et al. | .............. | 455/443 |
| 2004/0131029 A1* | 7/2004 | Tobe et al. | ..................... | 370/331 |
| 2004/0198234 A1* | 10/2004 | Wacker et al. | ............. | 455/67.13 |
| 2007/0129075 A1* | 6/2007 | Kim et al. | ..................... | 455/436 |
| 2008/0089296 A1* | 4/2008 | Kazmi et al. | ................... | 370/336 |

FOREIGN PATENT DOCUMENTS

| | | |
|---|---|---|
| EP | 1063783 A2 | 12/2000 |
| EP | 1530304 A1 | 5/2005 |
| WO | WO 2005/011163 A1 | 2/2005 |
| WO | WO 2006/099547 A1 | 9/2006 |

OTHER PUBLICATIONS

3GPP TS 25.309 V6.6.0: $3^{rd}$ Generation Partnership Project; Technical Specification Group Radio Access Network; FDD Enhanced Uplink; Overall description; Stage 2, Mar. 2006, pp. 1-34.

* cited by examiner

*Primary Examiner* — Andrew Wendell
(74) *Attorney, Agent, or Firm* — Fay Sharpe LLP

(57) ABSTRACT

The invention relates to a method for uplink transmission interference limitation in a wireless communications system comprising a mobile network arranged in a radio cell configuration, each cell comprising a serving base station providing communications service to at least one user terminal inside the cell area, the method comprising the steps of selecting and forcing a first group of cell-associated terminals to stop transmission for a certain period of time selecting a second group of terminals for measuring the signal power present at their uplink transmission frequency; calculating an indication of the interference level generated by at least the second group of selected terminals in at least one neighboring cell; selecting a third group of cell-associated terminals and setting their uplink transmission power to a certain value according to the calculated interference level.

10 Claims, 3 Drawing Sheets

METHOD AND APPARATUS FOR INTERFERENCE LIMITATION IN UPLINK COMMUNICATION IN A CELLULAR COMMUNICATION SYSTEM

The invention is based on a priority application EP 06300873.4 which is hereby incorporated by reference.

The present invention relates to wireless communications systems, and more particularly, to a method and an apparatus for interference limitation in uplink communication in a mobile radio system.

It is generally known that the interference caused by other radio transmissions is the major cause for quality degradation of any radio transmission. The performance of a cellular communication system depends on the interference situation found in the moment of the transmission of the radio blocks and on the capability of the network nodes to take advantage of the reception in different locations and later combination of the received radio frames.

The third generation (3G) evolution of Global Systems for Mobile communications (GSM) networks, commonly known as Universal Mobile Telecommunications Systems (UMTS), studies enhancements that can be applied to the radio access network in order to improve the performance on uplink dedicated transport channels. A known current specification dealing with uplink transmission in a cellular communication system can be found in 3GPP document TS 25.309 v6.6.0 (2006-03) "FDD Enhanced Uplink; Overall description", which is considered the closest state of the art. In such document a scheduling functionality is described that will be incorporated into a Node B to enable management of the uplink noise rise caused by different mobile stations or terminals. The Node B sends a resource indication (scheduling grant) to indicate to the terminal the maximum amount of uplink resources it may use e.g. an indication of the maximum allowed transmission power for that terminal.

The problem with such known uplink transmission method is that when the terminals are only connected to one base station, as is in a typical non-soft handover scenario, there is only a single cell (the serving cell) which is responsible for that uplink scheduling. In this case only intra-cell interference situation is taken into account when the serving base station sends scheduling grants to its associated terminals. Further, neighbor base stations cannot reduce the transmission power of the terminal provoking interference belonging to another base station. Under these circumstances, the uplink transmission interference situation may considerably degrade the uplink communication quality of the mobile radio access system.

SUMMARY OF THE INVENTION

It is the object of the present invention to provide a mechanism to limit interference for uplink communication in a cellular communications system.

The object is achieved by a method for uplink transmission interference limitation in a wireless communications system comprising a mobile network arranged in a radio cell configuration, each cell comprising a serving base station providing communications service to at least one user terminal inside the cell area, the method comprising the steps of:
  selecting and forcing a first group of cell-associated terminals to stop transmission for a certain period of time;
  selecting a second group of terminals for measuring the signal power present at their uplink transmission frequency;
  calculating an indication of the interference level generated by at least the second group of selected terminals in at least one neighbouring cell;
  selecting a third group of cell-associated terminals and setting their uplink transmission power to a certain value according to the calculated interference level.

This object is further achieved base station providing communications service to at least one user terminal inside its cell area, adapted to:
  select and provide an indication to a first group of its associated terminals to stop transmission for a certain period of time;
  receive or calculate an indication of the interference level generated by at least a second group of its associated terminals in at least one neighbouring cell;
  select and provide an indication to a third group of its associated terminals to set their uplink transmission power to a certain value according to the calculated interference level.

This object is further achieved by a mobile station comprising means for communication with a serving base station inside a cell area, adapted to:
  receive an indication to stop transmission for a certain period of time;
  measure the signal power present in its uplink transmission frequency;
  calculate an indication of the interference level generated in at least one neighbouring cell;
  set its uplink transmission power to a certain value according to the calculated interference level.

The basic idea of the invention is to provide scheduling of terminal uplink resources from a serving cell considering the interference the terminals will generate on neighbor cells.

According to the invention, the base station of the serving cell selects and forces a first group of its associated terminals to stop transmission for a period of time, said period of time is used by a second group of selected cell-associated terminals to measure the transmission power present on the uplink frequency, and then based on said measurement information an indication of the interference generation on neighbour cells is estimated and the uplink transmission power of a third group of selected cell-associated terminals is set to a certain value according to the calculated interference level generated on neighbouring cells. Said uplink transmission power value can be for example, a value which keeps said interference generated in neighbouring cells within a certain limit, e.g. a predefined total generated interference level.

Advantageous configurations of the invention emerge from the dependent claims, the following description and the drawings.

According to a first preferred embodiment of the invention, the second group of selected cell-associated terminals for making the measurements also evaluate the estimated interference influence to other radio cells and set their uplink transmission power autonomously. Although the base station of the serving cell may send resource indications to said terminals to set their uplink transmission power, said terminals autonomously set their uplink transmission power taking in consideration said calculated interference influence caused in neighbor cells.

According to a second preferred embodiment of the invention, the second group of selected cell-associated terminals for making the measurements send the uplink transmission power measurement information to the mobile network which evaluates the estimated interference influence provoked by those terminals on other radio cells and sets the uplink transmission power of a third group of selected terminals in that cell to a value according to the calculated interference level generated on neighbouring cells. In this case the cell-associated terminals do not need to further restrict their transmission power below the value received from the serving base station of the mobile network.

According to a third preferred embodiment of the invention, both the second group of selected cell-associated terminals and the mobile network evaluate the estimated interference influence generated by those terminals on other radio cells and set the terminals uplink transmission power accordingly. The second group of selected cell-associated terminals, for example, may set their uplink transmission power to a certain value and said value may be modified by the serving base station of the mobile network.

It is seen advantageous that, by using the proposed invention, the uplink transmission interference generated by the terminals on neighbour cells can be limited to a certain value particularly in network architecture scenarios where there is no soft handover (in soft handover terminals are connected to more than one base station) and even without the presence of a radio network node above the base station, e.g. a radio network controller or an access gateway.

A further advantageous effect is achieved due to the fact that during the measurement period the first group of selected terminals will not generate any interference on neighbor radio cells, thus enhancing the radio quality and the performance of the uplink transmissions in the other radio cells during said measurement phases. Even a further advantageous effect is that the uplink interference estimation done by the terminals or the mobile network may be used to increase the uplink transmission power of a selected group of terminals in a certain cell in a way so that the generated interference level by those terminals in neighbor cells is still within a certain limit, thus providing a mechanism to increase the resource use in that cell.

BRIEF DESCRIPTION OF THE DRAWINGS

An embodiment example of the invention is now explained with the aid of FIGS. 1 to 6.

DETAILED DESCRIPTION OF THE DRAWINGS

Figure 1:
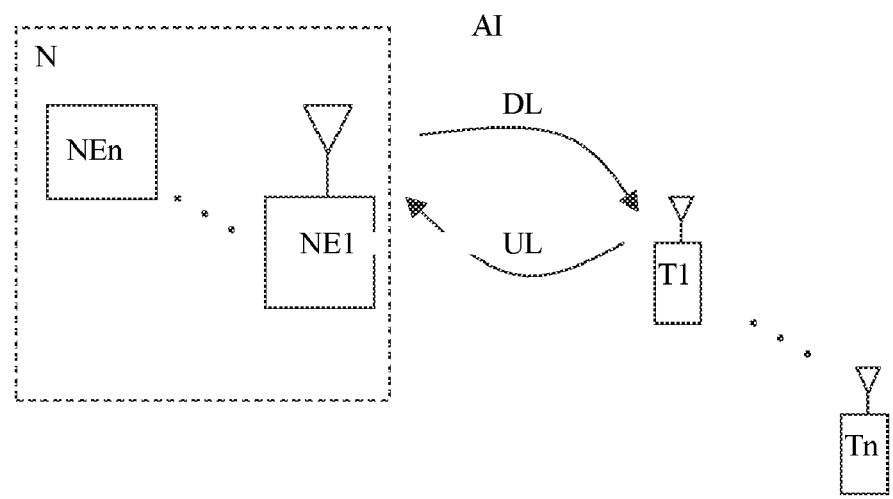
FIG. 1 illustrates a block diagram of a conventional wireless communications system including a mobile network communicating with a plurality of terminals.

FIG. 1 shows a block diagram of a wireless communications system in which a mobile radio network N, including a plurality of network elements or network nodes NE1 to NEn, and a plurality of user terminals T1 to Tn exchange data information via a radio air interface AI downlink connection DL and an uplink connection UL. The network elements NE1 to NEn can be for example base stations or Node Bs, radio network controllers (RNC), access gateways (aGW) or any other core network switches or communication elements which are generally used for wireless mobile communications.

A typical wireless communications system architecture comprises at least one network node connected to the core network (e.g. one aGW or one RNC) and connected to a plurality of Node Bs or base stations. The aGW or the RNC is controlling certain functions of the plurality of Node Bs or base stations for providing radio access network service. According to an embodiment of the invention, the radio network does not need the presence of an aGW or RNC for providing uplink transmission interference limitation.

Figure 2:
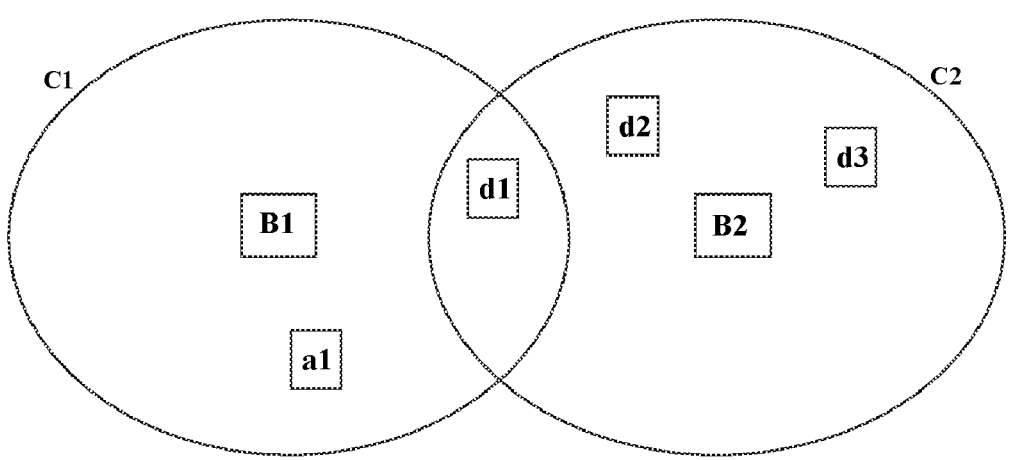
FIG. 2 schematically illustrates a wireless communications system with cellular radio service arrangement and applying uplink transmission interference limitation according to the invention.

FIG. 2 provides an example of a wireless communications system with cellular mobile radio network service arrangement according to the invention, comprising two base stations B1 and B2 providing communication inside radio cells C1 and C2 respectively to a plurality of user terminals a1 and d1 to d3.

In the example of the figure one terminal a1 is associated to the serving cell C1 and serving base station B1 and three terminals d1 to d3 are associated to the serving cell C2 and serving base station B2. The terminal a1 communicates only with its associated serving base station B1 of serving cell C1, and the base station B1 transmits a resource indication to at least one of its cell-associated terminals a1 comprising uplink maximum transmission power values, e.g. by means of scheduling grants (absolute or relative grants), taking in consideration the interference generated by said at least one terminal on neighbor cells C2. Similarly, the terminals d1 to d3 communicate only with their associated serving base station B2 of serving cell C2, and the base station B2 transmits a resource indication to at least one its cell-associated terminals d1 to d3 comprising uplink maximum transmission power values, e.g. by means of scheduling grants (absolute or relative grants), taking in consideration the interference generated by said at least one terminal on neighbor cells C1.

The terminals a1 and d1 to d3 receive resource indications only from their serving base stations at any time. The serving base stations B1 and B2 will be the sole responsible for allocating resources to a group of its cell-associated terminals taking in consideration the inter-cell interference generated by a group of its cell-associated terminals on neighbor cells.

According to the invention, for the evaluation of the current interference situation, the base stations B1 and B2 select and force a first group (one, a certain number or all) of their cell-associated terminals to stop transmission for a period of time. During said period of time a second group of cell-associated terminals is selected for measuring the received transmission power on the cell uplink frequency, at the same frequency they would normally transmit. The interval for such measurement periods shall be preferably short and adjustable and also distributed randomly from cell to cell to some extent to avoid that measurement periods in different radio cells are identical or overlap too often.

The higher the measured power is, the closer is a terminal to another non-serving radio cell and the more will that radio cell be influenced by any transmission of that terminal when it continues its uplink transmission. As an example, the mean interference I measured by terminal a1 when all other terminals d1 to d3 assigned to base station B2 are transmitting is in general I(dn, a1)=I(d1, a1)+I(d2, a1)+I(d3, a1), or the sum of the uplink transmission power of terminals d1 to d3 associated to serving cell C2 measured at the location of terminal a1. The mean interference I caused by a certain terminal a1 to a neighbour base station B2 is assumed to be proportional to the mean interference I caused by all transmitting terminals d1 to d3 assigned to that neighbour base station B2, at the location of the terminal a1, that is, I(a1, B2) is proportional to I(dn, a1). This means that, by measurement of the mean interference I(dn, a1) by terminal a1, such terminal can estimate the interference it generates on a neighbour base station B2.

As mentioned above, for the duration of the measurement of the interference received by the second selected group of terminals, the first selected group of terminals assigned to that base station may not transmit. For example, the base station B2 may select a first group of its associated terminals comprising all of its three associated terminals d1 to d3 and force them to stop transmission, but then select a second group of its associated terminals comprising only two of them d1 and d2 for making measurements. In a later step, the terminals of the second selected group d1 and d2 may autonomously set their maximum uplink transmission value calculated according to the interference generated by each of them on neighbour cells C1 and/or the base station B2 may select a third group of its associated terminals, comprising one terminal d1, two or all three terminals d1 to d3, and send them a resource indication with a maximum uplink transmission power value calculated according to the measurements received from the second group of terminals d1 and d2.

Figure 3:
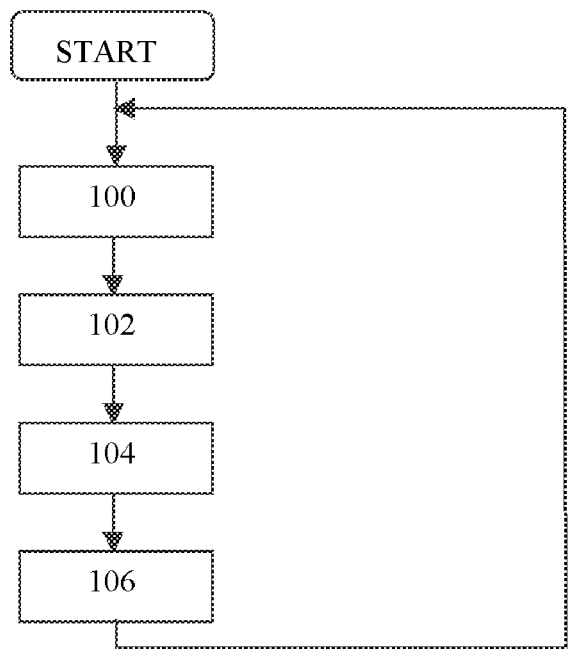
FIG. 3 shows a flow chart illustrating a first operation example of the uplink transmission interference limitation process according to the invention.

FIG. 3 shows a flow chart illustrating a first operation example of the uplink transmission interference reduction process according to the invention.

The serving base station B2, in a first step 100, selects a first group of its associated terminals (comprising one, two or all three of its associated terminals) and forces said first group of terminals to stop transmission for a certain period of time. During said time period, in step 102, the base station selects a second group of its associated terminals (comprising one, two or all three of its associated terminals) for measuring the transmission power received on their uplink transmission frequency. It is possible, in step 104, that the terminals of said second group of selected terminals autonomously calculate an indication of the interference generated in neighbor radio cells C1 and, in a next step 106, autonomously set their uplink transmission power to a certain value according to said calculated interference indication generated on neighbouring cells. Said uplink transmission power value can be for example, a value which keeps said interference generated in neighbouring cells C1 within a certain limit, said limit being for example a predefined total generated interference level.

Although it is possible, in this first example, that the cell-associated terminals d1 to d3 further receive a resource indication from their serving base station B2, or any other mobile network entity, for setting their uplink transmission power to a different value, the terminals d1 to d3 may not take in consideration said grant, since the base station B2 may have calculated such uplink transmission value without taking in consideration the interference generated by at least one of its associated terminals d1 to d3 in at least one neighbour cell C1.

In a similar way, the serving base station B1 and its associated terminals a1 will follow the same procedure explained above in FIG. 3 for setting the uplink transmission power according to the invention. As mentioned above, the measurement periods for the radio cells C1 and C2 shall preferably be distributed so that they do not overlap too often.

The procedure for uplink transmission interference limitations illustrated in FIG. 3 by way of steps 100 to 106 may be repeated in each radio cell C1 and C2 at determined time intervals, defined e.g. during setup of the base station via the O&M interface or be event driven, that is, triggered when a certain mobile network uplink transmission quality degradation is reached.

Figure 4:
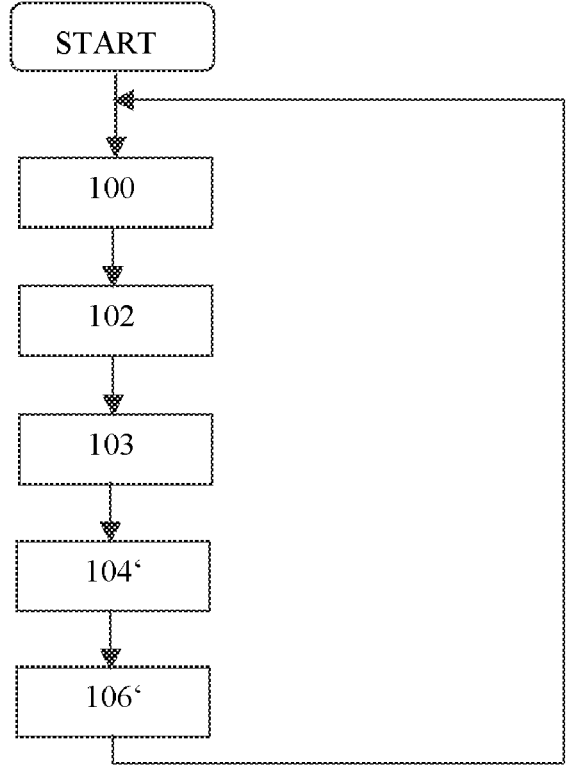
FIG. 4 shows a flow chart illustrating a second operation example of the uplink transmission interference limitation process according to the invention.

FIG. 4 shows a flow chart illustrating a second operation example of the uplink transmission limitation reduction process according to the invention.

The serving base station B2, in a first step 100, selects a first group of its associated terminals (comprising one, two or all three of its associated terminals) and forces said first group of terminals to stop transmission for a certain period of time. During said time period, in step 102, the base station selects a second group of its associated terminals (comprising one, two or all three of its associated terminals) for measuring the transmission power received on their uplink transmission frequency. It is possible, in step 103, that the terminals of said second group of selected terminals send a report containing an indication of said measurements to their serving base station B2 or any other mobile network entity. In step 104' said base station B2 or said mobile network entity receiving said measurement reports calculates an indication of the interference generated by said second selected group of terminals in neighbor radio cells C1 and, according to that calculation, the serving base station B2, in a next step 106', selects a third group of its associated terminals (comprising one, two or all three of its associated terminals) and sends that third group of terminals a resource indication to set their uplink transmission power to a certain value. Said uplink transmission power value can be for example, a value which keeps the total interference generated in neighbouring cells C1 within a certain predefined limit.

In a similar way, the serving base station B1 and its associated terminals a1 will follow the same procedure explained above in FIG. 4 for setting the uplink transmission power. As already mentioned, the measurement periods for the radio cells C1 and C2 shall preferably be distributed so that they do not overlap too often.

The procedure for uplink transmission interference limitation illustrated in FIG. 4 by way of steps 100 to 106' may be repeated in each radio cell C1 and C2 at determined time intervals, defined e.g. during setup of the base station via the O&M interface or be event driven, that is, triggered when a certain mobile network uplink transmission quality degradation is reached.

Figure 5:
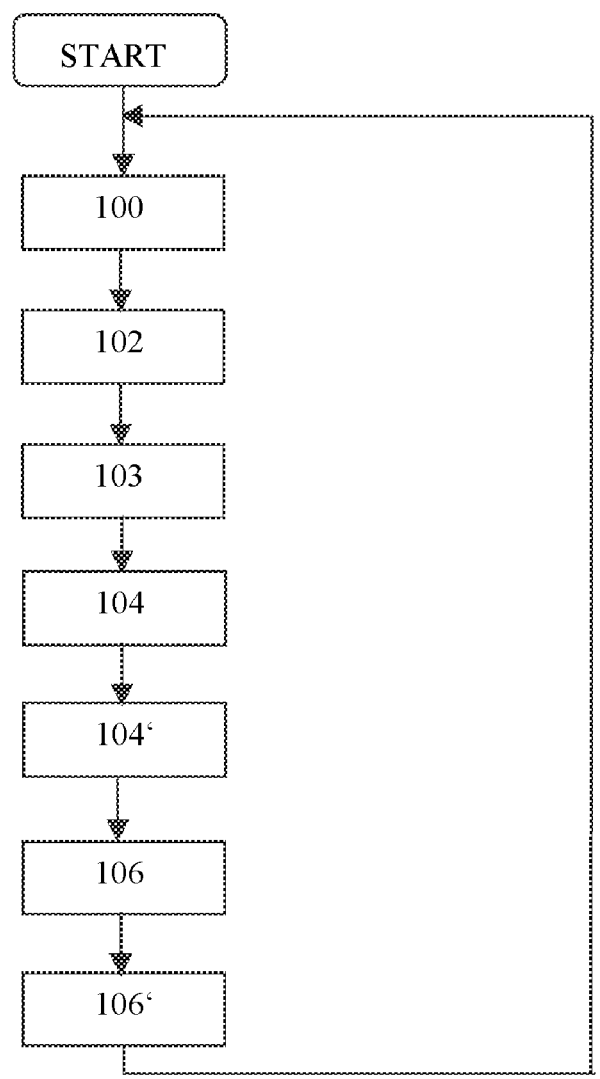
FIG. 5 shows a flow chart illustrating a third operation example of the uplink transmission interference limitation process according to the invention.

FIG. 5 shows a flow chart illustrating a third operation example of the uplink transmission interference limitation process according to the invention.

The serving base station B2, in a first step 100, selects a first group of its associated terminals (comprising one, two or all three of its associated terminals) and forces said first group of terminals to stop transmission for a certain period of time. During said time period, in step 102, the base station selects a second group of its associated terminals (comprising one, two or all three of its associated terminals) for measuring the transmission power received on their uplink transmission frequency. It is possible, in step 103, that the terminals of said second group of selected terminals send a report containing an indication of said measurements to their serving base station B2 or any other mobile network entity. Further, in step 104, it is also possible that the terminals of said second group of selected terminals autonomously calculate an indication of the interference generated in neighbor radio cells C1. In step 104' the base station B2 or the mobile network entity receiving the terminals measurement reports also calculates an indication of the interference generated by said second selected group of terminal in neighbor radio cells C1. According to their own interference calculations, in step 106, said second group of selected terminals may autonomously set their uplink transmission power to a first value, and later, in step 106', said value may be adjusted when the serving base station B2 sends a resource indication to a third group of its associated terminals to restrict or extend their uplink transmission power to a second value, e.g. a value that maintains the generated interference on that neighbour cell C1 below a certain total interference level. It is also possible then that the base station allocates a maximum uplink transmission power to the third group of terminals which is higher than the value calculated autonomously by the second group of terminals.

In a similar way, the serving base station B1 and its associated terminals a1 will follow the same procedure explained above in FIG. 5 for setting the uplink transmission power according to the invention. As already mentioned, the measurement periods for the radio cells C1 and C2 shall preferably be distributed so that they do not overlap too often.

The procedure for uplink transmission interference reduction illustrated in FIG. 5 by way of steps 100 to 106' may be repeated in each radio cell C1 and C2 at determined time intervals, defined e.g. during setup of the base station via the O&M interface or be event driven, that is, triggered when a certain mobile network uplink transmission quality degradation is reached.

Figure 6:
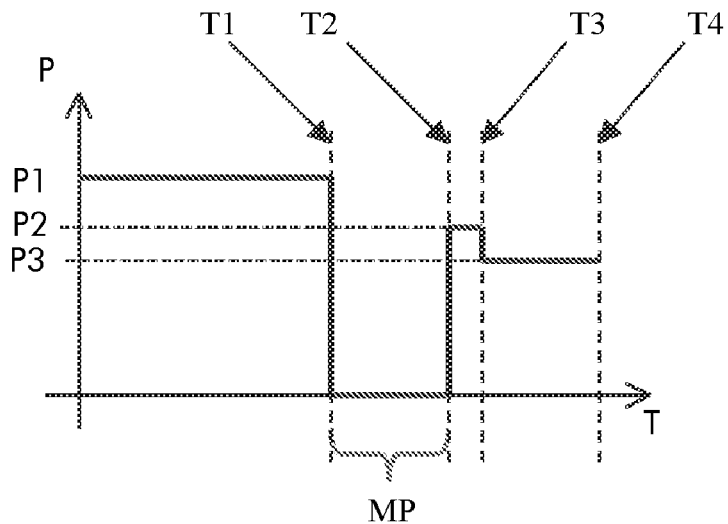
FIG. 6 shows an uplink transmission power diagram of a terminal corresponding to an uplink transmission interference limitation process according to the invention.

FIG. 6 shows an uplink transmission power P diagram corresponding to the behavior of a terminal on a time line T according to operation example of FIG. 5.

The terminal transmits initially in uplink direction with a maximum transmission power value P1. At time T1, when the mobile network applies the uplink transmission interference reduction process according to the invention, the mobile network selects and forces a first group (one, several or all) of the terminals associated with a serving cell to stop transmission. At time T1 then, the terminal selected in the first group of terminals stops transmission for a certain period of time MP. For the duration of said period of time MP, a second group of terminals associated to that serving cell is selected for measuring the signal power present in its uplink transmission frequency. The for measurements selected terminals send a measurement report to the serving base station and autonomously limit, at time T2, the transmission power P to a value P2 according to an estimation done by that terminal on the interference generated in neighbor cells. In the meantime, the serving base station has received the measurement report and also calculates an indication of the interference generated by that terminal on neighbor cells and the overall interference generated in the neighboring cells and according to said calculations it sends the corresponding resource indication to the terminal to limit or increase its uplink transmission power P. At time T3 the terminal receives a resource indication from its serving base station and sets its uplink transmission power to a new value P3. The terminal then transmits with that power value P3 until time T4 when the uplink transmission interference limitation procedure is repeated again for that cell.

It is understood that in the example above the serving base station may not be the only mobile network element to receive the measurement report from the terminal and even such measurement report may be sent only to another mobile network element which makes the interference influence calculation for that terminal and the whole cell and sends the corresponding resource indication instruction to the serving base station which forwards it to the terminal.

Further, it is understood that the means to carry out the method or certain steps of the method for uplink resource allocation herein described can be located anywhere in a network element of the radio mobile network and in the terminal, said means being implemented in hardware or software form. Finally, the method for uplink transmission interference reduction according to the invention is not limited to currently specified High Speed Uplink Packet Access (HSUPA) and may be used by other radio network access technologies.

The invention claimed is:

1. A method for uplink transmission interference limitation in a wireless communications system comprising a mobile network arranged in a radio cell configuration, each cell comprising a serving base station providing communications service to at least one user terminal inside the cell area, the method comprising the steps of:
   the serving base station selecting and forcing a first group of cell-associated terminals to stop transmission for a certain period of time;
   the serving base station selecting a second group of terminals for measuring received signal power present at their uplink transmission frequency during the certain period of time;
   the serving base station directing the second group of terminals to measure the signal power received by the terminals of the second group at the uplink frequency of the terminals of the second group during the certain period of time;
   calculating an indication of the interference level generated by at least the second group of selected terminals in at least one neighbouring cell based on the received signal power measured by the terminals of the second group;
   selecting a third group of cell-associated terminals and setting their uplink transmission power to a certain value according to the calculated interference level.

2. The method for uplink transmission interference limitation according to claim 1, wherein the uplink transmission power value is set to a value that keeps the interference generated on that neighbour cell within a certain limit.

3. The method for uplink transmission interference limitation according to claim 1 comprising: the second group of selected terminals autonomously calculating the indication of the interference level generated by that terminal in at least one neighbouring cell and autonomously setting its own uplink transmission power according to the calculated interference level.

4. The method for uplink transmission interference limitation according to claim 1 comprising: the second group of selected terminals sending a report with its measurements to the mobile network, said mobile network calculating the indication of the interference level generated by terminals in at least one neighbouring cell and sending a resource indication comprising the uplink transmission power value to a third group of cell-associated terminals.

5. The method for uplink transmission interference limitation according to claim 4 comprising: the second group of selected terminals further autonomously calculating the indication of the interference level generated by them in at least one neighbouring cell and autonomously setting their own uplink transmission power.

6. The method for uplink transmission interference limitation according to claim 1 wherein the measurement period of time is short and adjustable and randomly distributed from cell to cell.

7. The method for uplink transmission interference limitation according to claim 1 wherein the first group, the second group and the third group of terminals are all the terminals of the serving cell.

8. A base station providing communications service to at least one user terminal inside its cell area, the base station being adapted to:

select and provide an indication to a first group of its associated terminals to stop transmission for a certain period of time;

select at least a second group of its associated terminals to measure the signal power present at their uplink transmission frequency during the certain period of time;

direct the second group of terminals to measure the signal power received by the terminals of the second group at their uplink frequency during the certain period of time;

receive or calculate an indication of the interference level generated by the second group of its associated terminals in at least one neighbouring cell based on the signal power measured by the terminals of the second group;

select and provide an indication to a third group of its associated terminals to set their uplink transmission power to a certain value according to the received or calculated interference level.

9. A mobile network comprising a network element according to claim 8.

10. A mobile station comprising means for communication with a serving base station inside a cell area, the mobile station being adapted to:

receive an indication to stop transmission for a certain period of time from the serving base station;

stop transmitting during the certain period of time;

measure the signal power present in its uplink transmission frequency during the certain period of time;

calculate an indication of the interference level generated by the mobile station in at least one neighbouring cell based on the measured signal power; and set its uplink transmission power to a certain value according to the calculated interference level.

\* \* \* \* \*